Nov. 18, 1924.
J. G. TUBBS
AUTOMOBILE RADIATOR SHIELD
Filed Dec. 18, 1922
1,515,979
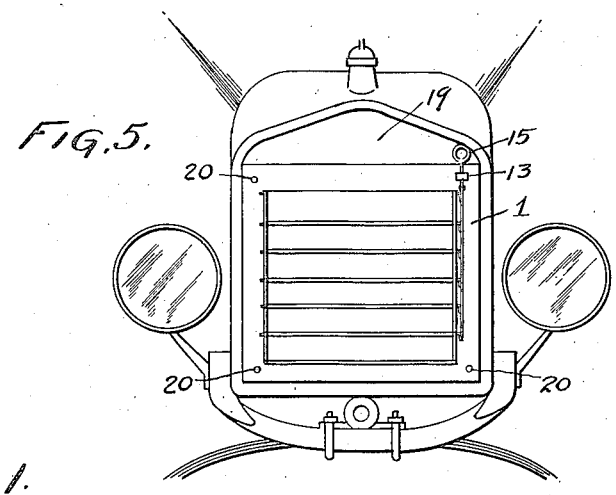
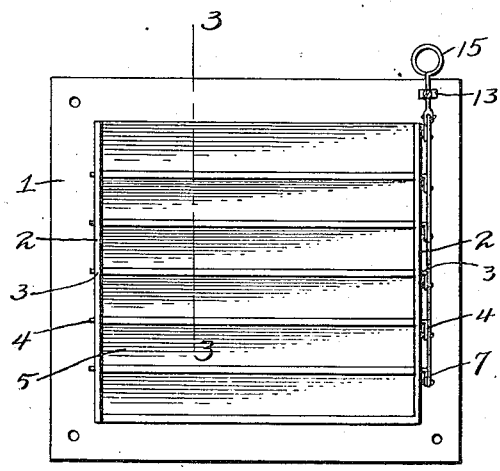
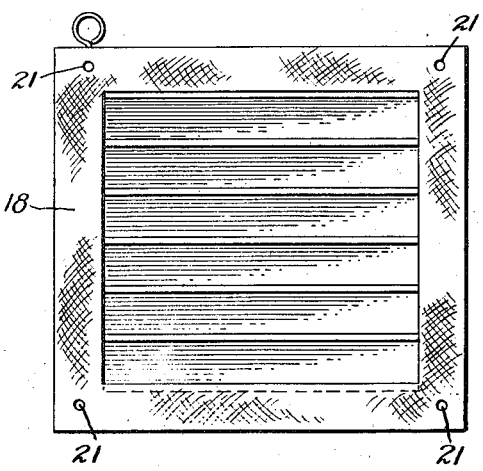
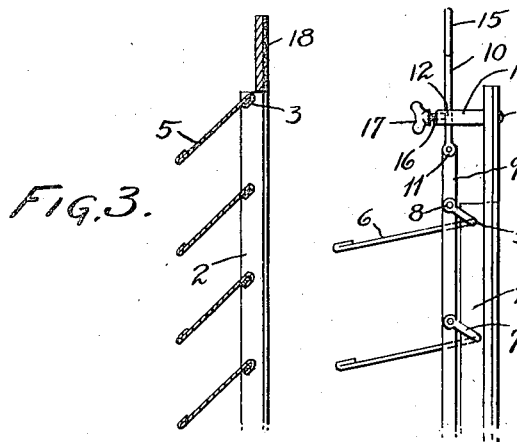
Inventor:
Jason G. Tubbs.

Patented Nov. 18, 1924.

1,515,979

UNITED STATES PATENT OFFICE.

JASON G. TUBBS, OF RICHFORD, NEW YORK.

AUTOMOBILE RADIATOR SHIELD.

Application filed December 18, 1922. Serial No. 607,572.

*To all whom it may concern:*

Be it known that I, JASON G. TUBBS, a citizen of the United States, and a resident of the town of Richford, county of Tioga, and State of New York, have invented certain new and useful Improvements in Automobile Radiator Shields, of which a specification follows.

This invention relates to improvements in automobile radiator shields, and its principal object is to provide a device to regulate the current of air coming in contact with the radiator core, motor, carburetor, oiling and water system of automobiles using water controlled engines, and which is efficient, durable, easily installed and which can be manufactured and sold at an extremely low cost.

An important object of the invention is to provide a device that is practically of one piece construction, and that can be easily installed upon the front of any shape, size or type automobile radiator, without in any way altering, modifying or changing the original construction of the radiator or any part of the automobile.

A further object of the device is that it very effectually prevents a radiator from freezing and that it can be adjusted to any desired opened position or be closed to protect the radiator core from exposure to cold air when the automobile is standing still.

The invention also consists of certain other features of construction and in the combination and arrangement of the several parts to be hereinafter fully described, illustrated in the accompanying drawings and specifically pointed out in the appended claims.

In describing my invention in detail reference will be had to the accompanying parts throughout the several views, and in which:—

Figure 1 is a front view of the shield with the shutters thereof arranged in closed position.

Figure 2 is a rear view of the shield with the shutters thereof similarly adjusted.

Figure 3 is a sectional view taken on line 3—3 of Figure 1.

Figure 4 is a side elevation of the operating lever illustrating the means for retaining the shutters in adjusted positions.

Figure 5 is a view showing the application of the shield to a radiator of an automobile.

Referring in detail to the drawings, the reference numeral 1 indicates a one piece metallic frame of a size to fit the outer exposed portion of the core of an automobile radiator as clearly shown in Figure 5 of the drawings. This one piece frame varies in size according to the make and model of the automobile. The inner side edges 2 of the frame 1 are bent inwardly to lie at right angles to the sides thereby providing inwardly extending flanges as shown. Openings 3 are formed in the flanges providing bearings 4 to receive the wires 6 of the shutters 5. The shutters 5 are composed of the same material as the frame 1. There may be any number of shutters as desired, according to the height of the radiator at which the shield is to be attached. The shutters are rounded upon themselves on the top or upper edge to provide a channelled shaped portion to receive the steel wires 6 which are threaded therethrough the entire length thereof. One end of each of the wires 6 projects through the openings 3 in one of the flanges 2 of the one piece frame 1 and this wire 6 is held firmly in the channelled shaped portion by this portion being crimped thereupon or said wires may be welded therein. The opposite ends of the wires 6 project through the openings 3 formed in the other flange, where the wires are bent at right angles to form crank portions 7 which have terminally provided thereon eyes for receiving the studs 8 laterally projecting from the operating lever 9, which extends vertically on the right hand side of the frame 1, the entire distance of the shutter opening formed in the frame. The operating lever 9 is in the form of an elongated strip and is vertically moved by a rounded handle member 10, the lower end of which is provided with an eye to receive stud 11' projecting from the upper end of the operating lever 9 as shown. This handle member 10 is guided in its movement and is held in position by passing through an opening 12 formed in post 13 which projects from the shell 1 and which forms a part of a locking device hereinafter described. The post 13 is secured to the top of the frame 1 in the right hand upper corner thereof by a bolt 14. The upper end of the handle member 10 is bent upon itself to provide a loop 15 which constitutes a gripping element to conveniently move the operating lever 9. Longitudinally formed in the outer end of the post 13 there is provided a threaded bore 16 adapted to receive a thumb screw 17. The inner end of the thumb screw being adapted to come in contact with the handle member whereby the contacting engagement between the screw and handle member will retain the handle member in the desired position for adjusting the shutters as will be readily apparent.

Secured to the back of the one piece frame 1 is a strip of felt 18. This felt prevents the frame from marring the radiator 19. The frame 1 is attached to the radiator 19 by bolts 20 of a length according to the thickness of the core of the radiator, the bolts pass through openings 21 formed in the four corners of the frame, and thence through the cells of the radiator core, the ends thereof projecting through the radiator to receive a plate washer and a nut which is associated therewith to secure and hold the frame in an operative position.

It is thought from the foregoing description that the advantages and novel features of my invention will be readily apparent, I desire it to be understood that I may make changes in the arrangement of several parts, provided that such changes fall within the scope of the appended claims.

Having thus described my invention, I claim:

1. An automobile radiator shield of the character described comprising a one piece frame secured to the radiator core, flanges integrally formed on the inner side edges of the frame and being provided with openings, wires having their ends received in the openings which provide bearings therefor, shutters depending from the wires and having their upper portions secured thereto and arranged in a manner whereby the adjacent portions thereof overlap, a post projecting outwardly from the frame and being provided with a bore longitudinally formed in its outer end, means for moving the shutters as a unit and a thumb screw received in the bore for contacting engagement with a portion of the shutter moving means which extends transversely through the post as and for the purpose specified.

2. An automobile radiator shield of the character described comprising a one piece frame secured at its corners to the front of the core of the radiator, inwardly extending flanges integrally formed on the inner edge of the sides of the frame and being provided with spaced vertically arranged aligned openings, wires received in the openings which provide bearings therefor, a shutter depending from each wire having its upper edge crimped thereabout to form a securing means between the shutter and wire respectively, said wires having cranked portions formed on one end, spaced studs upon the elongated strip engaging openings in the crank ends of the wire, a handle member pivotally secured to the upper end of the strip and means projecting from the frame to guide the handle member and to retain it in any desired position for the purpose specified.

JASON G. TUBBS.